United States Patent
Hokuto (10) Patent No.: US 8,655,573 B2
(45) Date of Patent: Feb. 18, 2014

(54) CONTROL APPARATUS FOR INTERNAL COMBUSTION ENGINE

(75) Inventor: Hiroyuki Hokuto, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/817,673

(22) PCT Filed: Dec. 16, 2010

(86) PCT No.: PCT/JP2010/072693
§ 371 (c)(1),
(2), (4) Date: Feb. 19, 2013

(87) PCT Pub. No.: WO2012/081111
PCT Pub. Date: Jun. 21, 2012

(65) Prior Publication Data
US 2013/0247869 A1 Sep. 26, 2013

(51) Int. Cl.
F02D 41/18 (2006.01)
F02D 9/08 (2006.01)
F02B 47/08 (2006.01)
F02M 25/07 (2006.01)

(52) U.S. Cl.
USPC ...... 701/108; 701/110; 123/399; 123/568.19; 123/568.21

(58) Field of Classification Search
USPC ............ 701/103, 108, 110; 123/344, 399, 123/568.19, 568.21
See application file for complete search history.

(56) References Cited

U.S. PATENT DOCUMENTS

| 5,279,273 A | 1/1994 | Nakata et al. |
| 6,016,788 A | 1/2000 | Kibe et al. |

FOREIGN PATENT DOCUMENTS

| JP | A 5-288123 | 11/1993 |
| JP | A 11-36962 | 2/1999 |
| JP | A 11-125137 | 5/1999 |
| JP | A 2000-97069 | 4/2000 |
| JP | A 2002-106405 | 4/2002 |
| JP | A 2002-332884 | 11/2002 |
| JP | A 2005-214081 | 8/2005 |

Primary Examiner — Hai Huynh
(74) Attorney, Agent, or Firm — Oliff PLC (57) ABSTRACT

A control apparatus for an internal combustion engine is provided that can successfully achieve a desired acceleration by avoiding an absence of torque of the internal combustion engine due to an influence of EGR gas when the torque increases toward a required torque. A required throttle valve opening degree TAreq is set based on a required torque TQreq in accordance with a required throttle valve opening degree map that defines a relation between the required torque TQreq and the required throttle valve opening degree TAreq. In addition, a required EGR valve opening degree EGRreq is set based on a required load factor KLreq in accordance with a required EGR valve opening degree map that defines a relation between the required load factor KLreq and the required EGR valve opening degree EGRreq.

7 Claims, 8 Drawing Sheets

*1: Fuel injection valve
*2: In-cylinder pressure
*3: Accelerator press-down degree

*6: With-EGR
*7: At high output power request or Without-EGR
*8: Control air amount by decreasing EGR valve opening degree in this section

Fig. 10

*9: Occurrence of torque absence of amount equivalent to difference (TQreq−TQreq')

CONTROL APPARATUS FOR INTERNAL COMBUSTION ENGINE

TECHNICAL FIELD

The present invention relates to a control apparatus for an internal combustion engine.

BACKGROUND ART

So far, for example, Patent Document 1 discloses a control apparatus for an internal combustion engine that is mounted on a hybrid vehicle that includes the internal combustion engine and a motor as its power source. According to the conventional control apparatus, a required torque that is required of the internal combustion engine is detected on the basis of the depression amount of an accelerator, and an intake air amount that is finally used for intake air amount control based on the depression amount of the accelerator is calculated. In addition, a throttle valve opening degree is adjusted so that an actual intake air amount that is detected using an air flow meter coincides with the aforementioned final intake air amount.

Including the above described document, the applicant is aware of the following documents as related art of the present invention.

CITATION LIST

Patent Documents

Patent Document 1: Japanese Laid-open Patent Application Publication No. 2000-97069
Patent Document 2: Japanese Laid-open Patent Application Publication No. Hei 5-288123
Patent Document 3: Japanese Laid-open Patent Application Publication No. Hei 11-36962
Patent Document 4: Japanese Laid-open Patent Application Publication No. 2005-214081

SUMMARY OF INVENTION

Technical Problem

There is known an internal combustion engine (an internal combustion for a hybrid vehicle, or a so-called, torque demand type internal combustion engine) that includes a configuration in which a required (target) throttle valve opening degree is set on the basis of a required torque required to the internal combustion engine, in accordance with a first relation information that defines a relation between the required torque and the required throttle valve opening degree. In addition, in order to improve fuel efficiency by decreasing pumping loss, an internal combustion engine is known that includes a configuration in which EGR control for introducing EGR gas into a cylinder (so-called, external EGR control) is performed by use of an EGR passage that communicates between an intake passage and an exhaust passage and use of an EGR valve that opens and closes the EGR passage in a predetermined operational region of the internal combustion engine. Hereinafter, a problem on the internal combustion engine having these configurations will be described with reference to FIG. 10.

Figure 10:
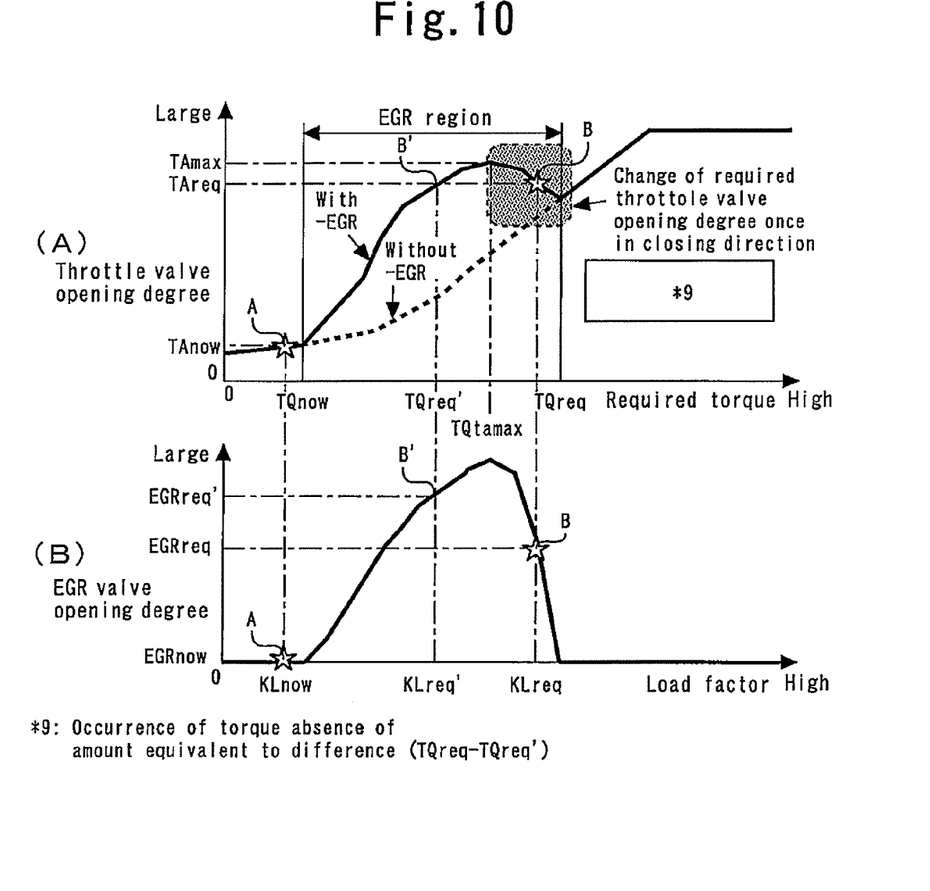
FIG. 10 is a diagram used for explaining the problem of the present invention.

FIG. 10 is a diagram used for explaining the problem of the present invention. More specifically, FIG. 10(A) is a diagram showing one example of a setting of a required throttle valve opening degree map (first relation information) that defines a relation between a required torque TQreq and a required throttle valve opening degree TAreq, with respect to a case of "with-EGR" in which EGR control is performed (solid line) and a case of "without-EGR" in which the EGR control is not performed (broken line); and FIG. 10(B) is a diagram showing one example of a setting of a required EGR valve opening degree map (second relation information) that defines a relation between an air amount information (herein, a load factor) concerning an air amount taken into the internal combustion engine and a required (target) EGR valve opening degree EGRreq of the EGR valve. In this connection, the setting shown in FIG. 10(A) is the one at an engine speed NE corresponding to the current actual torque TQnow.

In a system using the relations shown in each part of FIG. 10, the required EGR valve opening degree EGRreq is set in accordance with a required load factor KLreq (air amount information) as shown in FIG. 10(B). When a large amount of EGR gas is introduced by the external EGR control in response to a good fuel efficiency request, it is required to have a setting to increase the required throttle valve opening degree TAreq for obtaining the same required torque TQreq to a larger degree as compared with the case of "without-EGR", as shown in FIG. 10(A). The throttle valve opening degree is to be controlled at an opening degree close to full open under a situation that transitions toward a without-EGR region on a higher load side from an EGR region in which the external EGR control is performed using the aforementioned setting of the required throttle valve opening degree TAreq, and therefore, the intake air amount is dramatically increased by simply decreasing the EGR valve opening degree to decrease the EGR gas amount as shown in FIG. 10(B). Because of this, under such a situation, it is required to have a setting in which the required throttle valve opening degree TAreq is once changed in the closing direction as shown in FIG. 10 (A) in synchronization with decreasing the required EGR valve opening degree EGRreq. More specifically, it is required to have a setting region in which the required throttle valve opening degree TAreq becomes smaller with an increase in the required torque TQreq.

In a case in which the setting region described above is included, the throttle valve opening degree TA changes in a stepwise fashion toward the required throttle valve opening degree TAreq at the point B in the aforementioned setting region from the current throttle valve opening degree TAnow when the required torque TQreq at the point B is required at the current torque TQnow (at the point A). When, as described above, a required torque TQreq that is higher than the required torque TQtamax corresponding to the maximum value TAmax of the throttle valve opening degree TA in the required throttle valve opening degree map shown in FIG. 10(A) is required, two values that differ from each other in the EGR valve opening degree, that is, TQreq (at the point B) and TQreq' (at the point B') are present as torques that are able to be realized by the corresponding required throttle valve opening degree TAreq. The required EGR valve opening degree EGRreq is determined in accordance with the required load factor KLreq (air amount information) as described above. Therefore, the required EGR valve opening degree EGRreq' at the point B' becomes greater than the required EGR valve opening degree EGRreq at the point B.

When the required torque TQreq at the point B is required at the current torque TQnow (at the point A), the intake air amount (load factor KL) gradually increases after the throttle valve opening degree TA is controlled to the required throttle valve opening degree TAreq corresponding to the required torque TQreq. Further, the EGR valve opening degree is increased in accordance with a rise in the load factor KL, and thereby, the EGR gas amount increases. As a result of this, when the actual torque of the internal combustion engine is reached to TQreq' at which the EGR valve opening degree is controlled to EGRreq' that is higher than EGRreq, intake air is saturated due to the fact that a large amount of EGR gas has been introduced, and thereby, the torque becomes not able to increase any more. As a result of this, an absence of torque equivalent to an amount obtained by subtracting TQreq' from TQreq is caused, and thereby, a desired acceleration can not be achieved.

The present invention has been made to solve the problem as described above, and has its object to provide a control apparatus for an internal combustion engine, which can successfully achieve a desired acceleration by avoiding an absence of torque of the internal combustion engine due to an influence of EGR gas when the torque increases toward a required torque, in a case of having a configuration in which a required throttle valve opening degree is set on the basis of the required torque.

Solution to Problem

A first aspect of the present invention is a control apparatus for an internal combustion engine, comprising:

throttle valve control means for controlling, in accordance with a required throttle valve opening degree, a throttle valve opening degree of a throttle valve for adjusting an air amount that is taken into an internal combustion engine;

EGR valve control means for controlling, in accordance with a required EGR valve opening degree, an EGR valve opening degree of an EGR valve for opening and closing an EGR passage that makes an intake passage and an exhaust passage communicate with each other;

required torque obtaining means for obtaining a required torque that is required of the internal combustion engine;

air amount information obtaining means for obtaining an air amount information concerning the air amount;

required throttle valve opening degree setting means for setting the required throttle valve opening degree based on the required torque in accordance with a first relation information that defines a relation between the required torque and the required throttle valve opening degree;

required EGR valve opening degree setting means for setting the required EGR valve opening degree based on the air amount information in accordance with a second relation information that defines a relation between the air amount information and the required EGR valve opening degree; and required EGR valve opening degree limiting means for limiting the required EGR valve opening degree during a process in which an actual torque of the internal combustion engine transits toward a current required torque with, as an upper limit value, the required EGR valve opening degree obtained based on the air amount information for the current required torque and the second relation information.

A second aspect of the present invention is the control apparatus for an internal combustion engine according to the first aspect of the present invention, wherein in a case in which the required torque in a setting region of the first relation information in which the required throttle valve opening degree becomes smaller with an increase in the required torque is currently required, the required EGR valve opening degree limiting means limits the required EGR valve opening degree during the process in which an actual torque of the internal combustion engine transits toward the current required torque with, as the upper limit value, the required EGR valve opening degree obtained based on the air amount information corresponding to the required torque in the case and the second relation information.

A third aspect of the present invention is a control apparatus for an internal combustion engine, comprising:

throttle valve control means for controlling, in accordance with a required throttle valve opening degree, a throttle valve opening degree of a throttle valve for adjusting an air amount that is taken into an internal combustion engine;

EGR valve control means for controlling, in accordance with a required EGR valve opening degree, an EGR valve opening degree of an EGR valve for opening and closing an EGR passage that makes an intake passage and an exhaust passage communicate with each other;

required torque obtaining means for obtaining a required torque that is required of the internal combustion engine;

air amount information obtaining means for obtaining an air amount information concerning the air amount;

required throttle valve opening degree setting means for setting the required throttle valve opening degree based on the required torque in accordance with a first relation information that defines a relation between the required torque and the required throttle valve opening degree;

required EGR valve opening degree setting means for setting the required EGR valve opening degree based on the air amount information in accordance with a second relation information that defines a relation between the air amount information and the required EGR valve opening degree; and required throttle valve opening degree limiting means for limiting a current required throttle valve opening degree corresponding to a current required torque so that the current required throttle valve opening degree does not become smaller than the required throttle valve opening degree corresponding to a required torque that is lower than the current required torque.

A fourth aspect of the present invention is the control apparatus for an internal combustion engine according to the third aspect of the present invention, wherein when a required torque that is higher than a required torque corresponding to a maximum throttle valve opening degree that is maximum in the first relation information is currently required, the required throttle valve opening degree setting means uses, as the current required throttle valve opening degree, the maximum throttle valve opening degree.

A fifth aspect of the present invention is the control apparatus for an internal combustion engine according to the fourth aspect of the present invention, further comprising:

an in-cylinder pressure sensor for detecting an in-cylinder pressure of the internal combustion engine; and EGR feedback control means for when the maximum throttle valve opening degree is used under a situation in which a required torque that is higher than the required torque at the maximum throttle valve opening degree is required, performing a feedback control of the EGR valve opening degree so that the actual torque of the internal combustion engine that is obtained using the in-cylinder pressure sensor becomes the required torque.

A sixth aspect of the present invention is the control apparatus for an internal combustion engine according to any one of the first to fifth aspects of the present invention, wherein the internal combustion engine is mounted on a hybrid vehicle that includes a second power source in addition to the internal combustion engine.

Advantageous Effects of Invention

The first and second aspects of the present invention make it possible to prevent an absence of an intake air amount from occurring due to an influence of a large amount of EGR gas at acceleration and achieve a torque just required, even when a required torque in the setting region in which the required throttle valve opening degree becomes smaller with an increase in the required torque is currently required. Because of this, an absence of the torque can be avoided and thereby, an insufficient acceleration can be prevented successfully.

According to the third and fourth aspects of the present invention, the setting region in which the required throttle valve opening degree becomes smaller with an increase in the required torque is not provided with respect to the first relation information that defines the relation between the required torque and the required throttle valve opening degree. Because of this, according to the present invention, even when the EGR valve opening degree is largely controlled, an absence of an intake air amount can be prevented from occurring due to an influence of the EGR gas at acceleration, and thereby, a desired torque can be obtained. Therefore, an absence of the torque can be avoided and thereby, an insufficient acceleration can be prevented successfully.

The fifth aspect of the present invention makes it possible to accurately adjust the actual torque with high responsiveness toward the required torque in combination with the torque control using the in-cylinder pressure sensor, in a case in which the maximum throttle valve opening degree is used as the required throttle valve opening degree.

According to the sixth aspect of the present invention, in a case in which the control apparatus for the internal combustion engine of the present invention is applied to a hybrid vehicle that includes a second power source as well as the internal combustion engine, a desired acceleration is successfully achieved by avoiding an absence of torque of the internal combustion engine due to an influence of the EGR gas when the torque increases toward the required torque.

DESCRIPTION OF EMBODIMENTS

First Embodiment

[Configuration of HV System]

Figure 1:
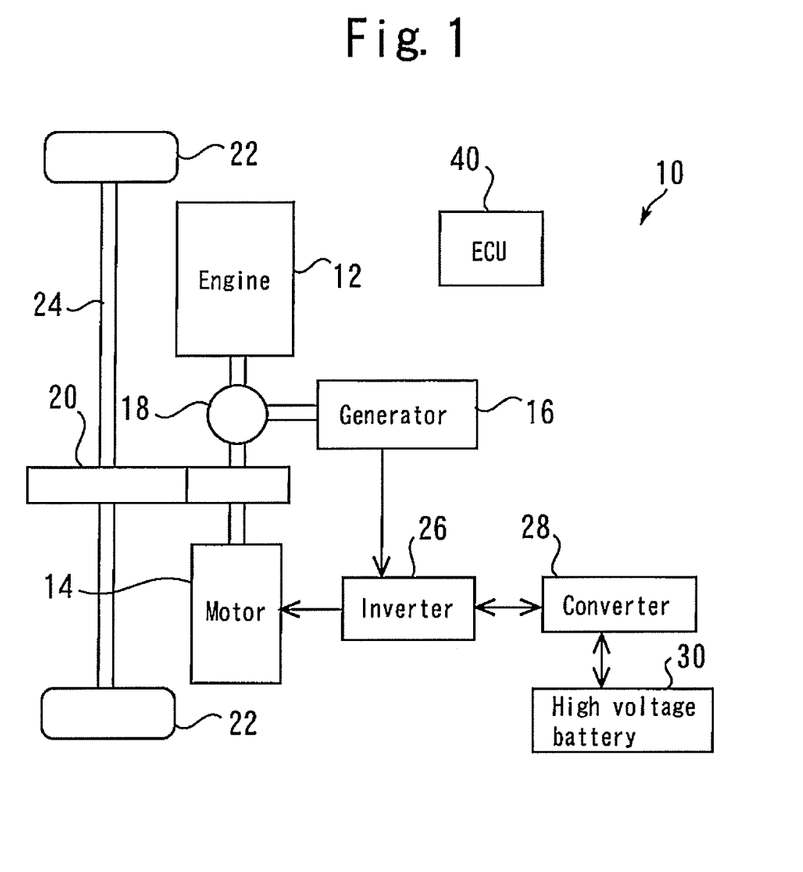
FIG. 1 is a diagram to show an outline configuration of a drive system of a hybrid vehicle to which the present invention is applied.

FIG. 1 is a diagram to show an outline configuration of a drive system 10 of a hybrid vehicle to which the present invention is applied. This drive system 10 includes a motor for driving the vehicle (hereafter, simply referred to as a "motor") 14 as the second power source for the vehicle in addition to an internal combustion engine 12. In addition, the drive system 10 also includes a generator 16 that receives the supply of a driving force to generate electric power. The internal combustion engine 12, the motor 14 and the generator 16 are interlinked via a power split mechanism 18 of planetary gear type. A speed reducer 20 is connected to the rotating shaft of the motor 14 in connection with the power split mechanism 18. The speed reducer 20 links the rotating shaft of the motor 14 with a driving shaft 24 which leads to driving wheels 22. The power split mechanism 18 is an apparatus to split the driving force of the internal combustion engine 12 into the generator 16 side and the speed reducer 20 side. The distribution of the driving force by the power split mechanism 18 can be freely changed.

The drive system 10 further includes an inverter 26, a converter 28 and a high voltage battery 30. The inverter 26 is connected to the generator 16 and the motor 14, and is also connected to the high voltage battery 30 via the converter 28. The electric power generated at the generator 16 can be supplied to the motor 14 via the inverter 26, and also can be charged to the high voltage battery 30 via the inverter 26 and the converter 28. Moreover, the electric power charged in the high voltage battery 30 can be supplied to the motor 14 via the converter 28 and the inverter 26.

According to the drive system 10 as so far described, based on a predetermined condition the driving wheels 22 can be rotated by the driving force of the internal combustion engine 12 alone with the motor 14 being deactivated, and conversely the driving wheels 22 can be rotated by the driving force of the motor 14 alone with the internal combustion engine 12 being deactivated. Moreover, it is also possible to activate both of the motor 14 and the internal combustion engine 12 and to rotate the driving wheels 22 by both of the driving forces. Further, the generator 16 is allowed to function as a starter to drive the internal combustion engine 12, and thereby, the start up of the internal combustion engine 12 can be controlled.

The drive system 10 of the present embodiment is controlled by an ECU (Electronic Control Unit) 40. The ECU 40 comprehensively controls the entire drive system 10 including the internal combustion engine 12, the motor 14, the generator 16, the power split mechanism 18, the inverter 26, the converter 28 and the like.

[System Configuration of Internal Combustion Engine]

Figure 2:
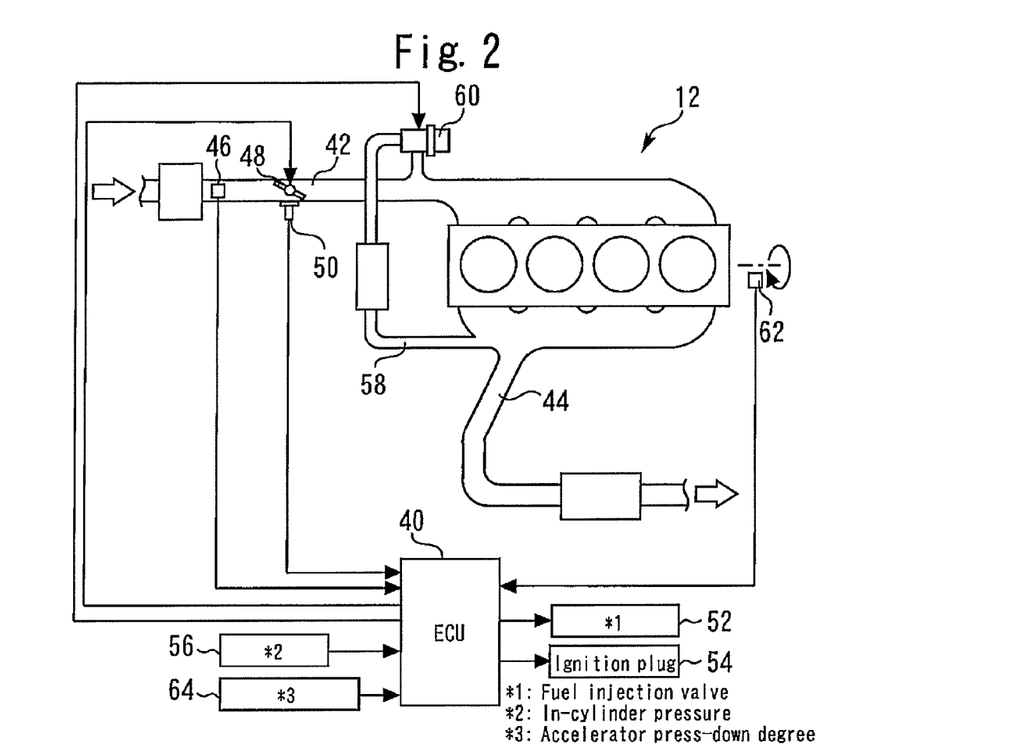
FIG. 2 is a diagram for explaining a system configuration of the internal combustion engine shown in FIG. 1.

FIG. 2 is a diagram for explaining a system configuration of the internal combustion engine 12 shown in FIG. 1. An intake passage 42 and an exhaust passage 44 communicate with each cylinder of the internal combustion engine 12. An air flow meter 46 that outputs a signal in accordance with the flow rate of air that is drawn into the intake passage 42 is provided in the vicinity of an inlet of the intake passage 42. A throttle valve 48 for adjusting an air amount that is taken into the cylinder is provided downstream of the air flow meter 46. The throttle valve 48 is an electronically controlled throttle valve which can control a throttle valve opening degree TA independently of an accelerator press-down degree. A throttle position sensor 50 for detecting the throttle valve opening degree TA is disposed near the throttle valve 48.

In addition, there are respectively installed for each cylinder of the internal combustion engine 12, a fuel injection valve 52 for injecting fuel into an intake port, and an ignition plug 54 for igniting an air-fuel mixture. An in-cylinder pressure sensor 56 for detecting an in-cylinder pressure is further installed for each cylinder.

Furthermore, the internal combustion engine 12 is provided with an EGR (Exhaust Gas Recirculation) passage 58 that connects the intake passage 42 on a downstream side of the throttle valve 48 with the exhaust passage 44. In the vicinity of a connection port on the intake passage 42 side in the EGR passage 58, an EGR valve 60 is installed for opening and closing the EGR passage 58. By changing the opening degree of the EGR valve 60, the amount of exhaust gas which passes through the EGR passage 58 is changed, and thereby, an EGR ratio can be adjusted.

There are connected to an input part of the aforementioned ECU 40, various sensors for detecting the operational state of the internal combustion engine 12, such as a crank angle sensor 62 for detecting an engine speed NE, as well as the air flow meter 46, the throttle position sensor 50 and the in-cylinder pressure sensor 56 that are described above. In addition, an accelerator press-down degree sensor 64 for detecting an accelerator press-down degree of an accelerator pedal of a hybrid vehicle on which the internal combustion engine 12 is mounted is connected to the input part of the ECU 40. Furthermore, there are connected to an output part of the ECU 40, various actuators for controlling the internal combustion engine 12, such as the throttle valve 48, the fuel injection valve 52, the ignition plug 54, the EGR valve 60 and the like. The ECU 40 controls the operational state of the internal combustion engine 12 on the basis of the outputs of those sensors.

Figure 3:
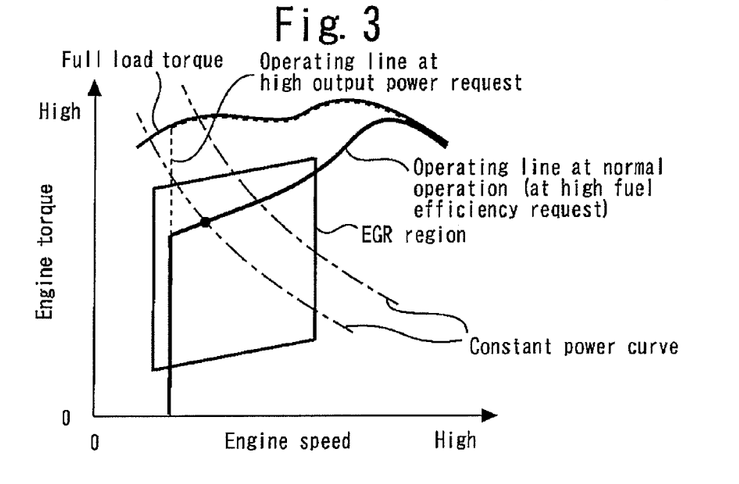
FIG. 3 is a diagram showing the operational region of the internal combustion engine that is represented by the relation between the torque and the engine speed NE.

FIG. 3 is a diagram showing the operational region of the internal combustion engine 12 that is represented by the relation between the torque and the engine speed NE.

The curve represented by the solid line in FIG. 3 shows an operating line that at the time of normal operation of the internal combustion engine 12 (the time in which good fuel efficiency is requested), is obtained by connecting each best fuel efficiency torque point (operating point at which the internal combustion engine 12 can be operated with the best fuel efficiency) on each constant power curve at each particular time. More specifically, as shown in FIG. 3, the operating line in this case is obtained in such a manner that from the low speed and low load operational state, the torque largely increases with a very little increase in the engine speed NE and then both of the torque and the engine speed are increasing. According to the drive system 10 of the present embodiment, adjusting the operation of the generator 16 at the time of the operation of the internal combustion engine 12 can adjust the magnitude of a load applied to the internal combustion engine 12 from the generator 16. Thus, according to the present drive system 10, the opening degree of the throttle valve 48 is adjusted at the internal combustion engine 12 side, while adjusting the operation of the generator 16, and thereby, the operational state of the internal combustion engine 12 can be controlled along the aforementioned operating line.

On the other hand, the curve represented by the broken line in FIG. 3 shows an operating line in a case in which a high output power request has been issued to the internal combustion engine 12. The operating line in this case is configured so as to move along the full load torque line after the torque is promptly increased toward the full load torque as shown in FIG. 3.

In addition, FIG. 3 shows one example of an EGR region in which an EGR control by means of the adjustment of the EGR valve 60 (so-called, an external EGR control) is executed. As shown in FIG. 3, the EGR region of the present embodiment is set as a region excluding an extra low load region and a high load region.

Further, in the internal combustion engine 12 mounted on the hybrid vehicle having the above described drive system 10, a required (target) throttle valve opening degree TAreq in accordance with an output power request from a driver is calculated in the following procedures. More specifically, a required output power for the vehicle as a whole from the driver is obtained on the basis of the accelerator press-down degree. Then, this required output power for the vehicle as a whole is divided into a required output power of the motor 14 and a required output power of the internal combustion engine 12. On that basis, at the time in which good fuel efficiency is requested, a torque at the point of intersection between the constant power curve with the required output power of the internal combustion engine 12 and the operating line at the time of normal operation, that is to say, a torque for achieving the required output power of the internal combustion engine with the best fuel efficiency state, is calculated as a required torque TQreq at the time of the current request for the vehicle output power, as shown in FIG. 3.

Figure 4:
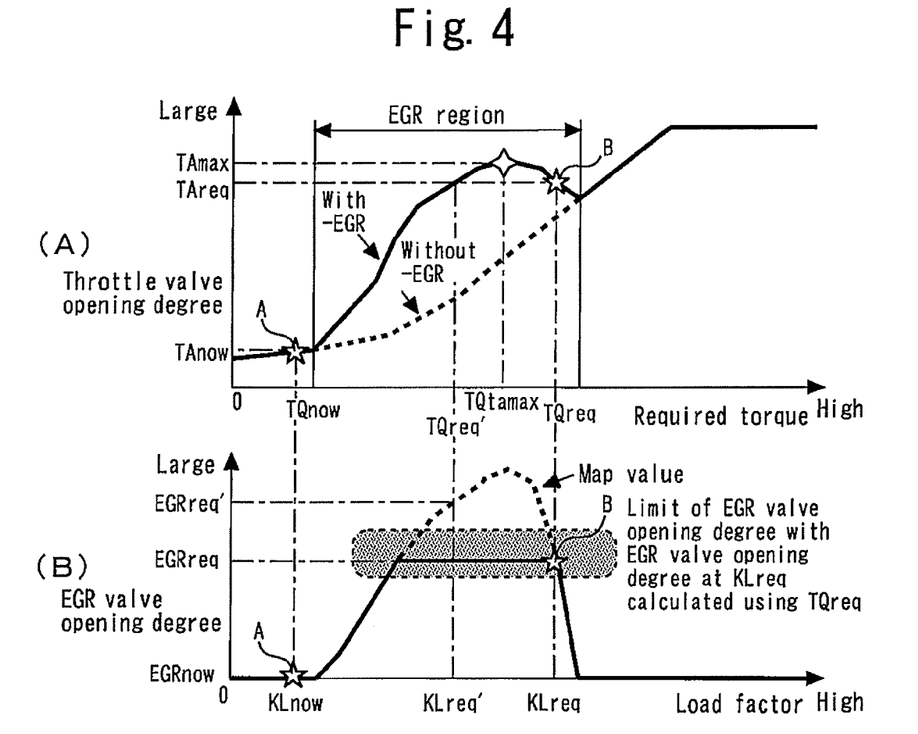
FIG. 4 is a diagram showing a characteristic setting of a required throttle valve opening degree TAreq and a required EGR valve opening degree EGRreq.

FIG. 4 is a diagram showing a characteristic setting of a required throttle valve opening degree TAreq and a required EGR valve opening degree EGRreq. More specifically, FIG. 4(A) is a diagram showing one example of a setting of a required throttle valve opening degree map (first relation information) that defines the relation between the required torque TQreq and the required throttle valve opening degree TAreq, regarding a case of "With EGR" (solid line) in which the external EGR control is performed and a case of "Without EGR" (broken line) in which the external EGR control is not performed; and FIG. 4(B) is a diagram showing one example of a setting of a required EGR valve opening degree map (second relation information) that defines the relation between an air amount information (herein, load factor KL) concerning an air amount taken into the internal combustion engine 12 and a required (target) opening degree of the EGR valve 60 (required EGR valve opening degree EGRreq). In this connection, the setting shown in FIG. 4(A) is the one at the time of the engine speed NE corresponding to the current torque TQnow.

In the present embodiment, a required throttle valve opening degree TA is calculated from the current required torque TQreq in accordance with the relation as shown in FIG. 4(A), that is, a required throttle valve opening degree map that defines a relation between the required torque TQreq and the required throttle valve opening degree TAreq. The ECU 40 stores the required throttle valve opening degree map that defines the relation as shown in FIG. 4(A). More specifically, the ECU 40 stores two kinds of maps as a map (solid line) of "with-EGR case" and a map (broken line) of "without-EGR case", and switches between these maps depending on whether or not a request to execute the external EGR control is present.

According to the map of "with-EGR case", the required throttle valve opening degree TAreq is set so as to be greater than that of "without-EGR case", in order to meet, in the EGR region, the same torque request as that at the time of "without-EGR case". In addition, in the map of "with-EGR case", the required throttle valve opening degree TAreq is set so as to increase with an increase in the required torque TQreq. However, the map of "with-EGR case" has a setting in which, as shown in FIG. 4(A), the required throttle valve opening degree TAreq is once changed in the closing direction in order to prevent the intake air amount from rapidly increasing as a result of a decrease in the EGR gas amount during a transition from the EGR region to the non-EGR region on the higher load side. In other words, the map of "with-EGR case" has a setting region in which the required throttle valve opening degree TAreq decreases with an increase in the required torque TQreq.

Furthermore, in the present embodiment, the required EGR valve opening degree EGRreq is calculated from a required load factor KLreq in accordance with a required EGR valve opening degree map that defines a relation between the required load factor KLreq (air amount information) and the required EGR valve opening degree EGRreq, as shown in FIG. 4(B).

In a case in which the required torque TQreq on point B is requested from the current torque TQnow (on point A), the intake air amount (load factor KL) gradually increases after the throttle valve opening degree TA is controlled to the required throttle valve opening degree TAreq that corresponds to the required torque TQreq. Then, the EGR valve opening degree increases with the increase in the required load factor KLreq, and thereby, the EGR gas amount increases. If, in such a case, the required EGR valve opening degree map having the setting in which as shown in FIG. 10(B) (as shown by the broken line in FIG. 4(B)), the required EGR valve opening degree EGRreq increases with an increase in the required load factor KLreq is used, the intake air is saturated when the actual torque is reached to TQreq' that is implemented in a state in which the EGR valve opening degree is largely controlled, and thereby, the torque becomes not able to increase any more. As a result of this, an absence of a torque equivalent to an amount obtained by subtracting TQreq' from TQreq is caused, and thereby, a desired acceleration can not be achieved.

Accordingly, in the present embodiment, when the required torque TQreq that is higher than a required torque TQtamax corresponding to a maximum throttle valve opening degree TAmax is currently required as shown in FIG. 4(A), the required EGR valve opening degree EGRreq in the course of the actual torque of the internal combustion engine 12 transitioning toward the current required torque TQreq is limited with, as an upper limit value, the required EGR valve opening degree EGRreq at the time when the required load factor KLreq corresponding to the current required torque TQreq is obtained.

Figure 5:
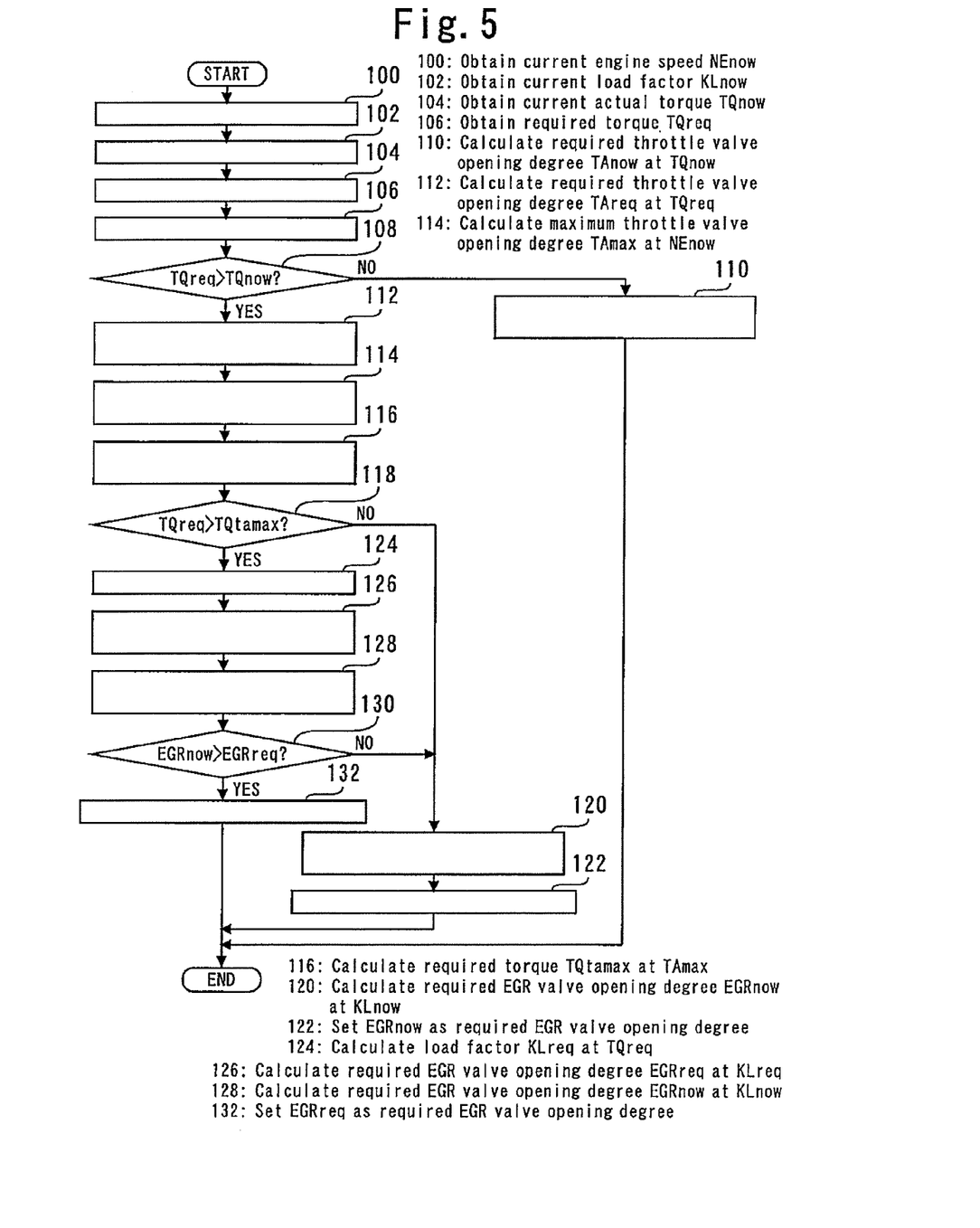
FIG. 5 is a flowchart of a routine that is executed in a first embodiment of the present invention.

FIG. 5 is a flowchart that illustrates a routine that is executed by the ECU 40 in the present first embodiment to implement the above described functionality. The present routine is executed repeatedly at predetermined time intervals.

In the routine shown in FIG. 5, first, the current engine speed NEnow is obtained by use of the output of the crank angle sensor 62 (step 100). Next, the current load factor KLnow is obtained (step 102). Specifically, the current load factor KLnow is calculated on the basis of the intake air amount obtained by use of the air flow meter 46 and the engine speed NE.

Next, the current actual torque TQnow is obtained (step 104). According to the hybrid vehicle equipped with the drive system 10 shown in FIG. 1, the actual torque TQnow of the internal combustion engine 12 can be calculated based on the control electric current for controlling the torque generated by the generator 16. In this connection, for example, a torque sensor may be provided and the actual torque TQnow of the internal combustion engine 12 may be obtained by use of the torque sensor.

Next, the current required torque TQreq is obtained (step 106). The required torque TQreq is calculated based on the accelerator press-down degree as described above with reference to FIG. 3. Then, it is determined whether or not the required torque TQreq is higher than the current actual torque TQnow (step 108).

If, as a result, it is determined that the determination of aforementioned step 108 is negative, that is, it can be judged that the current actual torque TQnow is reached to the required torque TQreq, the required throttle valve opening degree TAnow corresponding to the current actual torque TQnow is calculated in accordance with a predetermined required throttle valve opening degree map (see FIG. 4(A)) (step 110). More specifically, the map is set for every predetermined engine speed NE, and in present step 110, the required throttle valve opening degree map corresponding to the current engine speed NEnow is referred to.

IF, on the other hand, it is determined that the determination of aforementioned step 108 is positive, that is, it can be judged that the current actual torque TQnow has not reached to the required torque TQreq yet, the required throttle valve opening degree TAreq corresponding to the current required torque TQreq is calculated in accordance with the aforementioned required throttle valve opening degree map (step 112).

Next, the maximum throttle valve opening degree TAmax at the current engine speed NEnow is calculated in accordance with the aforementioned required throttle valve opening degree map (step 114). Then, the required torque TQtamax corresponding to the maximum throttle valve opening degree TAmax is calculated in accordance with the aforementioned required throttle valve opening degree map (step 116).

Next, it is determined whether or not the current required torque TQreq is higher than the required torque TQtamax at the maximum throttle valve opening degree TAmax (step 118). If, as a result, it is determined that the current required torque TQreq is lower than or equal to the aforementioned required torque TQtamax, that is to say, it can be judged that the required torque in the setting region (see FIG. 4(A)) in which the required throttle valve opening degree becomes smaller with an increase in the required torque is not currently required, the required EGR valve opening degree EGRnow corresponding to the current load factor KLnow is calculated in accordance with a predetermined required EGR valve opening degree map (step 120). In this connection, it is assumed that the required EGR valve opening degree map that is stored by the ECU 40 for the processing of the present routine defines the relation shown by the broken line in FIG. 4(B) (relation shown in FIG. 10(B)). In this case, the EGR valve opening degree EGRnow calculated in present step 120 is set as the current required EGR valve opening degree (step 122).

If, on the other hand, it is determined in aforementioned step 118 that the current required torque TQreq is higher than the aforementioned required torque TQtamax, that is to say, it can be judged that the required torque in the setting region in which the required throttle valve opening degree becomes smaller with an increase in the required torque is currently required, the required load factor KLreq corresponding to the current required torque TQreq is calculated (step 124). Specifically, the ECU 40 stores in advance the relation between the required torque TQreq and the required load factor KLreq, and in present step 124, the required load factor KLreq is calculated using such relation.

Next, the required EGR valve opening degree EGRreq corresponding to the required load factor KLreq calculated in aforementioned step 124 is calculated in accordance with the required EGR valve opening degree map (step 126). Then, the required EGR valve opening degree EGRnow corresponding to the current load factor KLnow is calculated by a similar processing to that in aforementioned step 120 (step 128).

Next, it is determined whether or not the required EGR valve opening degree EGRnow calculated in aforementioned step 128 is higher than the required EGR valve opening degree EGRreq calculated in aforementioned step 126 (step 130). If, as a result, the required EGR valve opening degree EGRnow is smaller than or equal to the required EGR valve opening degree EGRreq, the required EGR valve opening degree EGRnow corresponding to the current load factor KLnow is set as the current required EGR valve opening degree (step 122). If, on the other hand, the required EGR valve opening degree EGRnow is higher than the required EGR valve opening degree EGRreq, the required EGR valve opening degree EGRnow is not used, and the required EGR opening EGRreq calculated in aforementioned step 126 is set as the current required EGR valve opening degree (step 132).

According to the routine shown in FIG. 5 described so far, if it is determined that the current required torque TQreq is higher than the aforementioned required torque TQtamax, that is, it can be judged that a required torque in the setting region in which the required throttle becomes smaller with an increase in the required torque is currently required, the required EGR valve opening degree in the course of the actual torque of the internal combustion engine 12 transitioning toward the current required torque TQreq is limited with, as an upper limit value, the required EGR valve opening degree EGRreq calculated on the basis of the required load factor KLreq corresponding to the current required torque TQreq and the required EGR valve opening degree map. This makes it possible to prevent an absence of the intake air amount from occurring due to an influence of a large amount of EGR gas at acceleration and achieve a torque just required, even when a required torque in the setting region in which the required throttle valve opening degree becomes smaller with an increase in the required torque is currently required. Because of this, an absence of the torque can be avoided and thereby, an insufficient acceleration can be prevented successfully. In addition, resolving the absence of the torque of the internal combustion engine 12 at acceleration in this way eliminates the need for compensating the torque by the motor 14. Therefore, wasteful electric power consumption by the motor 14 can be prevented, and as a result, fuel efficiency of the internal combustion engine 12 can be improved.

Incidentally, in the first embodiment, which has been described above, the ECU 40 controls the throttle valve opening degree TA of the electronically controlled throttle valve 48 in accordance with the required throttle valve opening degree TAreq, whereby the "throttle valve control means" according to the first aspect of the present invention is realized; the ECU 40 controls the EGR valve opening degree of the EGR valve 60 in accordance with the required EGR valve opening degree EGRreq, whereby the "EGR valve control means" according to the first aspect of the present invention is realized; the ECU 40 executes the processing of aforementioned step 106, whereby the "required torque obtaining means" according to the first aspect of the present invention is realized; the ECU 40 executes the processing of aforementioned step 124, whereby the "air amount information obtaining means" according to the first aspect of the present invention is realized; the ECU 40 executes the processing of aforementioned step 112, whereby the "required throttle valve opening degree setting means" according to the first aspect of the present invention is realized; the ECU 40 executes the processing of aforementioned steps 126 and 128, whereby the "required EGR valve opening degree setting means" according to the first aspect of the present invention is realized; and the ECU 40 executes the processing of aforementioned step 132 or 122 in accordance with the determination result of aforementioned step 130, whereby the "required EGR valve opening degree limiting means" according to the first aspect of the present invention is realized.

Second Embodiment

Next, a second embodiment of the present invention will be described with reference to FIGS. 6 and 7.

The system of the present embodiment can be implemented by using the hardware configuration shown in FIGS. 1 and 2 and causing the ECU 40 to execute the routine shown in FIG. 7 described below, instead of the routine shown in FIG. 5.

Figure 6:
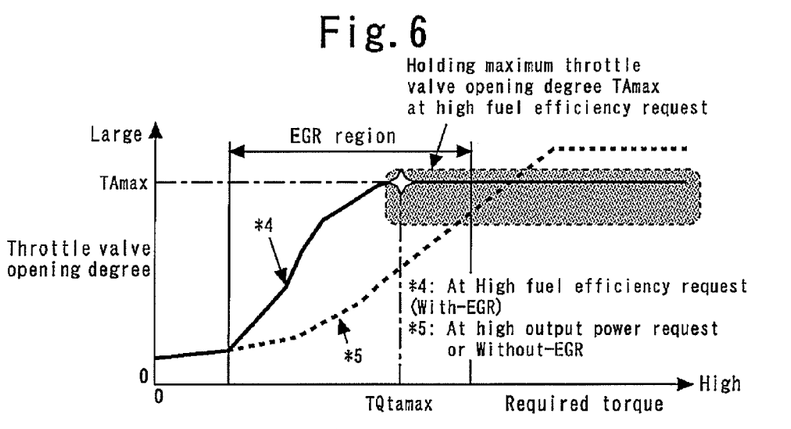
FIG. 6 is a diagram showing a characteristic setting of a required throttle valve opening degree TAreq according to a second embodiment of the present invention.

FIG. 6 is a diagram showing a characteristic setting of a required throttle valve opening degree TAreq according to the second embodiment of the present invention.

In the first embodiment described above, in order to prevent an absence of the torque from being caused due to an influence of a large amount of EGR gas at acceleration, if it can be judged that a required torque in the setting region in which the required throttle valve opening degree becomes smaller with an increase in the required torque is currently required, the required EGR valve opening degree EGRreq in the course of the actual torque of the internal combustion engine 12 transitioning toward the current required torque TQreq is limited with, as an upper limit value, the required EGR valve opening degree EGRreq calculated on the basis of the required load factor KLreq corresponding to the current required torque TQreq and the required EGR valve opening degree map.

In contrast to this, as shown in FIG. 6, the present embodiment has the following setting with respect to the required throttle valve opening degree map that defines the relation between the required torque TQreq and the required throttle valve opening degree TAreq, in a "with-EGR case" (a time in which good fuel efficiency is requested). In other words, in the present embodiment, the required throttle valve opening degree TAreq corresponding to the current required torque TQreq is set so as not to become smaller than the required throttle valve opening degree corresponding to a required torque that is lower than the current required torque TQreq. More specifically, if a required torque that is higher than the required torque TQtamax corresponding to the maximum throttle valve opening degree TAmax that is maximum in the required throttle valve opening degree map is currently required, the maximum throttle valve opening degree TAmax is used as the current required throttle valve opening degree TAreq.

In addition, in the present embodiment, unlike the above described first embodiment, no limit is put on the required EGR valve opening degree EGRreq calculated in accordance with the required load factor KLreq (air amount information). Therefore, in the present embodiment, as the required EGR valve opening degree map that defines the relation between the required load factor KLreq (air amount information) and the required EGR valve opening degree EGRreq, a map that defines the relation shown by the broken line in FIG. 4(B) (relation shown in FIG. 10(B)) is used, the illustration of which is herein omitted.

Furthermore, in the present embodiment, when a high output power request is issued to the internal combustion engine 12, unlike the "with-EGR case", holding the required throttle valve opening degree TAreq at a predetermined opening degree (the aforementioned maximum throttle valve opening degree TAmax) is not performed as shown by the broken line in FIG. 6. In this connection, in the present embodiment, a torque value on the operating line (ses FIG. 3) at the normal operation (a time in which good fuel efficiency is requested) is set so as to be smaller than or equal to the torque TQtamax that is achieved at the maximum throttle valve opening degree TAmax.

Figure 7:
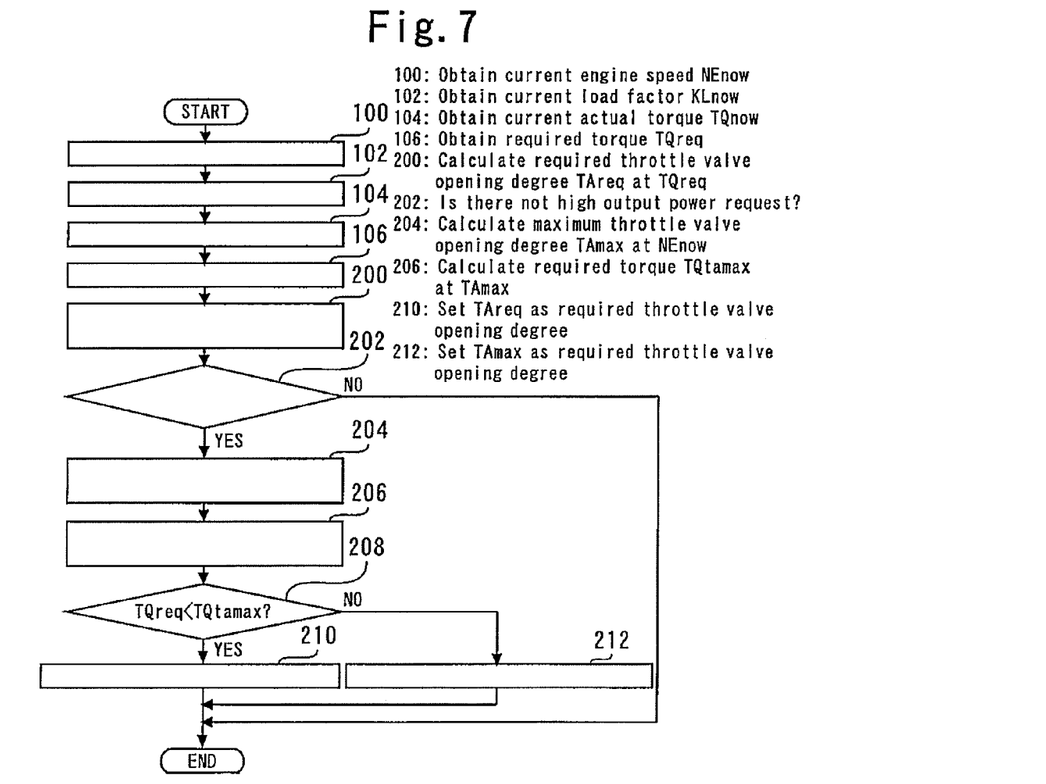
FIG. 7 is a flowchart of a routine that is executed in the second embodiment of the present invention.

FIG. 7 is a flowchart that illustrates a routine that is executed by the ECU 40 in the present second embodiment to implement the above described functionality. In FIG. 7, the same steps as the steps shown in FIG. 5 in the first embodiment will be assigned with the same reference numerals, and the description thereof will be omitted or simplified.

In the routine shown in FIG. 7, after the current engine speed NEnow, the current load factor KLnow, the current actual torque TQnow and the current required torque TQreq are obtained in steps 100 to 106, respectively, the required throttle valve opening degree TAreq corresponding to the current required torque TQreq is calculated in accordance with a predetermined throttle valve opening degree map (see FIG. 6) (step 200).

Next, it is determined whether the current torque request to the internal combustion engine 12 is not a high output power request (step 202). The determination of present step 202 is executed based on whether or not the accelerator press-down degree is smaller than or equal to a predetermined determination value. Specifically, if the accelerator press-down degree is smaller than or equal to the determination value, it is judged that the current torque request to the internal combustion engine 12 is not a high output power request, that is, a request for good fuel efficiency with a performance of the external EGR control.

If the aforementioned determination of step 202 is positive, the maximum throttle valve opening degree TAmax at the current engine speed NEnow is calculated in accordance with the aforementioned required throttle valve opening degree map (step 204). Then, the required torque TQtamax corresponding to the maximum throttle valve opening degree TAmax is calculated in accordance with the aforementioned required throttle valve opening degree map (step 206).

Next, it is determined whether or not the current (present) required torque TQreq is lower than the required torque TQtamax at the maximum throttle valve opening degree TAmax (step 208). If, as a result, it is determined that the current required torque TQreq is lower than the aforementioned required torque TQtamax, that is, it can be judged that a required torque TQreq in the setting region (see FIG. 6) in which the required throttle valve opening degree becomes greater with an increase in the required torque is currently required, the required throttle valve opening degree TAreq calculated in aforementioned step 200 is set as the current (present) required throttle valve opening degree (step 210).

If, on the other hand, it is determined in aforementioned step 208 that the current required torque TQreq is higher than or equal to the aforementioned required torque TQtamax, the required throttle valve opening degree TAmax calculated in aforementioned step 204 is set as the current (present) required throttle valve opening degree (step 212).

According to the routine shown in FIG. 7 described so far, under a situation in which the current required torque TQreq is higher than or equal to the aforementioned required torque TQtamax, the required throttle valve opening degree is held at the maximum throttle valve opening degree TAmax. As a result of this, unlike the setting shown in FIG. 4(A), a setting region in which the required throttle valve opening degree becomes smaller with an increase in the required torque is not provided with respect to the required throttle valve opening degree map that defines the relation between the required torque TQreq and the required throttle valve opening degree TAreq as shown in FIG. 6. Because of this, even when the EGR valve opening degree is largely controlled, an absence of the intake air amount can be prevented from occurring due to an influence of the EGR gas at acceleration, and thereby, a desired torque can be obtained. Therefore, an absence of the torque can be avoided and thereby, an insufficient acceleration can be prevented successfully.

Meanwhile, in the second embodiment, which has been described above, the required throttle valve opening degree is held at the maximum throttle valve opening degree TAmax under the situation in which the current required torque TQreq is higher than or equal to the aforementioned required torque TQtamax. The best fuel efficiency of an internal combustion engine is normally attained under a situation in which such maximum throttle valve opening degree TAmax is used, one reason of which is that pumping loss becomes small. Unlike the case like this, when a torque with the best fuel efficiency is obtained under a situation in which the throttle valve opening degree TA is smaller than the aforementioned maximum throttle valve opening degree TAmax, the required throttle valve opening degree may be held at a throttle valve opening degree at which the torque with the best fuel efficiency is obtained.

Incidentally, in the second embodiment, which has been described above, the ECU 40 controls the throttle valve opening degree TA of the electronically controlled throttle valve 48 in accordance with the required throttle valve opening degree TAreq, whereby the "throttle valve control means" according to the third aspect of the present invention is realized; the ECU 40 controls the EGR valve opening degree of the EGR valve 60 in accordance with the required EGR valve opening degree EGRreq, whereby the "EGR valve control means" according to the third aspect of the present invention is realized; the ECU 40 executes the processing of aforementioned step 106, whereby the "required torque obtaining means" according to the third aspect of the present invention is realized; the ECU 40 calculates the load factor KL based on the intake air amount obtained using the air flow meter 46 and the engine speed NE, whereby the "air amount information obtaining means" according to the third aspect of the present invention is realized; the ECU 40 executes the processing of aforementioned step 200, whereby the "required throttle valve opening degree setting means" according to the third aspect of the present invention is realized; the ECU 40 calculates the required EGR valve opening degree EGRreq based on the load factor KL and the required EGR valve opening degree map, whereby the "required EGR valve opening degree setting means" according to the third aspect of the present invention is realized; and the ECU 40 executes the processing of aforementioned step 210 or 212 in accordance with the determination result of aforementioned step 208, whereby the "required throttle valve opening degree limiting means" according to the third aspect of the present invention is realized.

Third Embodiment

Next, a third embodiment of the present invention will be described with reference to FIGS. 8 and 9.

The system of the present embodiment can be implemented by using the hardware configuration shown in FIGS. 1 and 2 and causing the ECU 40 to execute the routine shown in FIG. 9 described below, instead of the routine shown in FIG. 7.

Figure 8:
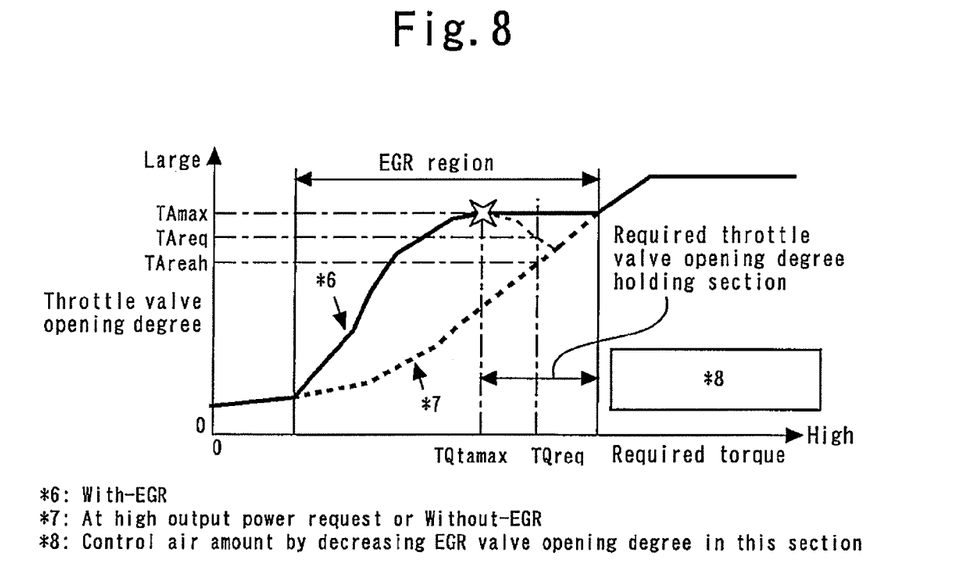
FIG. 8 is a diagram for explaining a characteristic control at acceleration according to a third embodiment of the present invention.

FIG. 8 is a diagram for explaining a characteristic control at acceleration according to the third embodiment of the present invention.

In the present embodiment as well, when a required torque TQreq that is higher than the required torque TQtamax at the maximum throttle valve opening degree TAmax is required in the EGR region, the required throttle valve opening degree is held at the maximum throttle valve opening degree TAmax as in the first embodiment described above. Hereinafter, a section in which the required throttle valve opening degree is held at the maximum throttle valve opening degree TAmax in such a manner is referred to as a "required throttle valve opening degree holding section".

In the required throttle valve opening degree holding section, it is necessary to adjust the intake air amount so as to obtain the required torque TQreq by adjusting the EGR gas amount using the control of the EGR valve opening degree. However, the required EGR valve opening degree map as shown in FIG. 10(B) is a map that defines the relation between the required load factor KLreq and the required EGR valve opening degree EGRreq at the steady state of the internal combustion engine 12. In addition, the responsiveness of the EGR valve 60 is lower than that of the throttle valve 48. Therefore, by simply adjusting the opening degree of the EGR valve 60 by use of the required EGR valve opening degree map in the required throttle valve opening degree holding section described above, it is difficult to accurately adjust the actual torque TQnow with high responsiveness toward the required torque TQreq under a situation in which a large throttle valve opening degree TA, such as the maximum throttle valve opening degree TAmax, is used.

The internal combustion engine 12 shown in FIG. 2 includes the in-cylinder pressure sensor 56. Since such in-cylinder pressure sensor 56 is included, the actual torque of the internal combustion engine 12 can be obtained in real time. Accordingly, in the present embodiment, when a required torque TQreq in the required throttle valve opening degree holding section is currently required, a feedback control of the EGR valve opening degree is performed so that the actual torque obtained using the in-cylinder pressure sensor 56 becomes the required torque TQreq.

In addition, in the present embodiment, when the required throttle valve opening degree TAreq calculated using the required throttle valve opening degree map at the "without-EGR case" (the relation shown by the broken line in FIG. 8) is greater than the aforementioned maximum throttle valve opening degree TAmax as shown in FIG. 8, holding the required throttle valve opening degree is suspended. Further, in this case, the required throttle valve opening degree TAreqh at the "without-EGR case" is set as the current required throttle valve opening degree.

Figure 9:
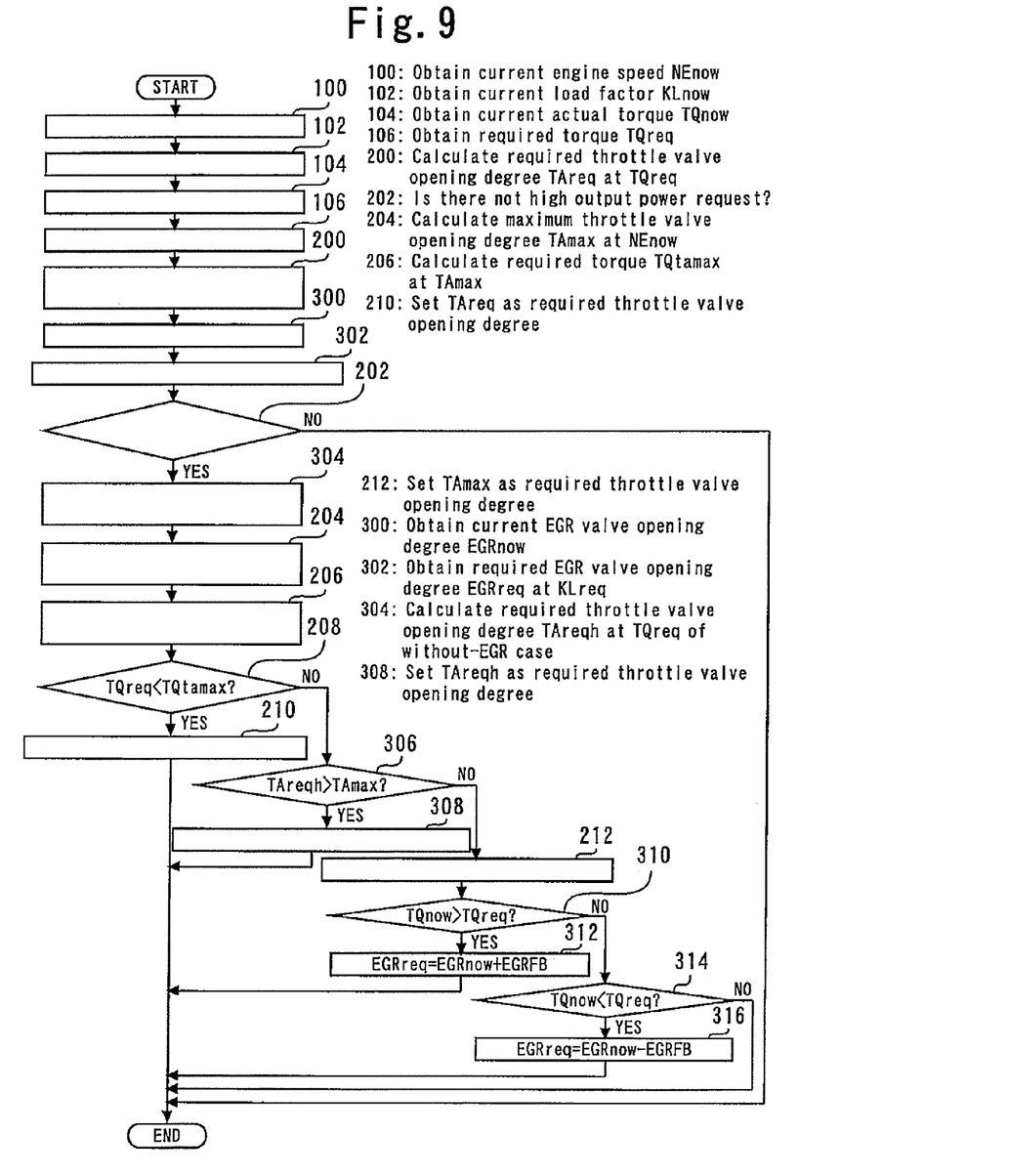
FIG. 9 is a flowchart of a routine that is executed in the third embodiment of the present invention.

FIG. 9 is a flowchart that illustrates a routine that is executed by the ECU 40 in the present third embodiment to implement the above described functionality. In FIG. 9, the same steps as the steps shown in FIG. 7 in the second embodiment will be assigned with the same reference numerals, and the description thereof will be omitted or simplified.

In the routine shown in FIG. 9, after the required throttle valve opening degree TAreq corresponding to the current required torque TQreq is calculated in step 200, the current EGR valve opening degree EGRnow is obtained (step 300).

Specifically, the current EGR valve opening degree EGRnow is calculated on the basis of the current load factor KLnow.

Next, the required EGR valve opening degree EGRreq corresponding to the required load factor KLreq is calculated in accordance with a predetermined required EGR valve opening degree map (the relation shown in FIG. 10(B)) after the required load factor KLreq corresponding to the current required torque TQreq is calculated (step 302). Then, if it is determined in step 202 that the current torque request for the internal combustion engine 12 is not a high output power request, a required throttle valve opening degree TAreqh at the without-EGR case, which corresponds to the current required torque TQreq in the "without-EGR case" is calculated in accordance with a predetermined required throttle valve opening degree map (the relation shown by the broken line in FIG. 8) (step 304).

In addition, in the routine shown in FIG. 9, if it is determined in step 208 that the current required torque TQreq is lower than the aforementioned required torque TQtamax, the required throttle valve opening degree TAreq calculated in aforementioned step 200 is set as the current (present) required throttle valve opening degree (step 210). If, on the other hand, it is determined that the current required torque TQreq is higher than or equal to the aforementioned required torque TQtamax, it is then determined whether or not the required throttle valve opening degree TAreqh at the without-EGR case is greater than the maximum throttle valve opening degree TAmax (step 306).

If it is determined in aforementioned step 306 that the required throttle valve opening degree TAreqh at the without-EGR case is greater than the maximum throttle valve opening degree TAmax, the required throttle valve opening degree TAreqh calculated in aforementioned step 304 is set as the current (present) required throttle valve opening degree (step 308).

If, on the other hand, it is determined in aforementioned step 306 that the required throttle valve opening degree TAreqh at the without-EGR case is smaller than or equal to the maximum throttle valve opening degree TAmax, the maximum throttle valve opening degree TAmax calculated in aforementioned step 204 is set as the current (present) required throttle valve opening degree (step 310). In this case, it is then determined whether or not the current actual torque TQnow is higher than the current required torque TQreq (step 212).

If it is determined in aforementioned step 310 that the current actual torque TQnow is higher than the current required torque TQreq, the required EGR valve opening degree EGRreq is corrected to a value obtained by adding a predetermined EGR correction amount EGRFB to the current EGR valve opening degree EGRnow (step 312). If, on the other hand, it is determined in aforementioned step 310 that the current actual torque TQnow is lower than or equal to the current required torque TQreq, it is then determined that the current actual torque TQnow is lower than the current required torque TQreq (step 314). If, as a result, the determination of present step 314 is positive, the required EGR valve opening degree EGRreq is corrected to a value obtained by subtracting the aforementioned EGR correction amount EGRFB from the current EGR valve opening degree EGRnow (step 316).

According to the routine shown in FIG. 9 described so far, under a situation in which the current required torque TQreq is higher than or equal to the aforementioned required torque TQtamax and the required throttle valve opening degree TAreqh at the without-EGR case is smaller than or equal to the maximum throttle valve opening degree TAmax, the required throttle valve opening degree is held at the maximum throttle valve opening degree TAmax. As a result of this, as already described in the second embodiment, even when the EGR valve opening degree is largely controlled, an absence of the intake air amount can be prevented from occurring due to an influence of the EGR gas at acceleration, and thereby, a desired torque can be obtained. Therefore, an absence of the torque can be avoided and thereby, an insufficient acceleration can be prevented successfully.

In addition, according to the above described routine, if the aforementioned maximum throttle valve opening degree TAmax is selected as the required throttle valve opening degree, the feedback control of the EGR valve opening degree is performed. As a result of this, if it is determined that the current actual torque TQnow is higher than the current required torque TQreq, the intake air amount can be decreased by increasing the required EGR valve opening degree EGRreq by the EGR correction amount EGRFB, and thereby, the actual torque can be decreased. If, on the other hand, it is determined that the current actual torque TQnow is lower than or equal to the current required torque TQreq, the intake air amount can be increased by decreasing the required EGR valve opening degree EGRreq by the EGR correction amount EGRFB, and thereby, the actual torque can be increased. As described above, according to the feedback control of the EGR valve opening degree, the actual torque obtained by means of the in-cylinder pressure sensor 56 can be controlled so as to be the required torque TQreq. This makes it possible to accurately adjust the actual torque with high responsiveness toward the required torque TQreq in combination with the torque control using the in-cylinder pressure sensor 56, in a case in which the required throttle valve opening degree is held at the aforementioned maximum throttle valve opening degree TAmax. Further, the EGR gas amount can be accurately controlled with high responsiveness, and thereby, combustion of the internal combustion engine 12 can be prevented from deteriorating due to excess EGR gas amount.

Incidentally, in the third embodiment, which has been described above, the ECU 40 executes a series of the processing of aforementioned steps 310 to 316, whereby the "EGR feedback control means" according to the fifth aspect of the present invention is realized.

In the first to third embodiments, which have been described above, the description is made by taking an example in which a control apparatus for an internal combustion engine according to the present invention is applied to the internal combustion engine 12 for a hybrid vehicle that includes the motor 14 as the second power source as well as the internal combustion engine 12. However, an internal combustion engine that is applicable to a control apparatus for an internal combustion engine according to the present invention is not limited to the one described above, and may be an internal combustion engine that performs torque control for the internal combustion engine in accordance with a required throttle valve opening degree based on a required torque (so-called, a torque demand type internal combustion engine).

DESCRIPTION OF SYMBOLS

10 drive system
12 internal combustion engine
14 motor
16 generator
18 power split mechanism
40 ECU (Electronic Control Unit)
42 intake passage
44 exhaust passage
46 air flow meter
48 throttle valve
50 throttle position sensor
52 fuel injection valve
54 ignition plug
56 in-cylinder pressure sensor
58 EGR passage
60 EGR valve
62 crank angle sensor
64 accelerator press-down degree sensor

The invention claimed is:

1. A control apparatus for an internal combustion engine, comprising:
a throttle valve that adjusts an air amount that is taken into an internal combustion engine;
an EGR valve that opens and closes an EGR passage that makes an intake passage and an exhaust passage communicate with each other; and
a controller that is configured to:
control, in accordance with a required throttle valve opening degree, a throttle valve opening degree of the throttle valve;
control, in accordance with a required EGR valve opening degree, an EGR valve opening degree of the EGR valve;
obtain a required torque that is required of the internal combustion engine;
obtain an air amount information concerning the air amount;
set the required throttle valve opening degree based on the required torque in accordance with a first relation information that defines a relation between the required torque and the required throttle valve opening degree; and
set the required EGR valve opening degree based on the air amount information in accordance with a second relation information that defines a relation between the air amount information and the required EGR valve opening degree,
wherein the second relation information is set so that with respect to an increase in a value of the air amount information, the required EGR valve opening degree increases and then decreases,
wherein the first relation information has a setting region in which with respect to an increase in the required torque, the required throttle valve opening degree once decreases, in association with the required EGR valve opening degree being set in the second relation information so as to decrease with respect to the increase in the value of the air amount information, and
wherein the controller is further configured to:
in a process in which an actual torque of the internal combustion engine transits toward a required torque in the setting region in a state in which an actual throttle valve opening degree has been controlled to a required throttle valve opening degree corresponding to the required torque in the setting region when the required torque in the setting region is required at acceleration, limit the required EGR valve opening degree so that the required EGR valve opening degree obtained during the process of transition on a basis of the air amount information changing during the process of transition and the second relation information does not exceed a final required EGR valve opening degree at the acceleration obtained on a basis of the air amount information corresponding to the required torque in the setting region and the second relation information, with the final required EGR valve opening degree at the acceleration as an upper limit value.

2. The control apparatus for an internal combustion engine according to claim 1,
wherein the internal combustion engine is mounted on a hybrid vehicle that includes a second power source in addition to the internal combustion engine.

3. A control apparatus for an internal combustion engine, comprising:
a throttle valve that adjusts an air amount that is taken into an internal combustion engine;
an EGR valve that opens and closes an EGR passage that makes an intake passage and an exhaust passage communicate with each other; and
a controller that is configured to:
control, in accordance with a required throttle valve opening degree, a throttle valve opening degree of the throttle valve;
control, in accordance with a required EGR valve opening degree, an EGR valve opening degree of the EGR valve;
obtain a required torque that is required of the internal combustion engine;
obtain an air amount information concerning the air amount;
set the required throttle valve opening degree based on the required torque in accordance with a first relation information that defines a relation between the required torque and the required throttle valve opening degree; and
set the required EGR valve opening degree based on the air amount information in accordance with a second relation information that defines a relation between the air amount information and the required EGR valve opening degree,
wherein the second relation information is set so that with respect to an increase in a value of the air amount information, the required EGR valve opening degree increases and then decreases,
wherein the first relation information is set in an introduced region of EGR gas so that with respect to an increase in the required torque, the required throttle valve opening degree increases and then decreases, in association with the required EGR valve opening degree being set in the second relation information so as to increase and then decrease with respect to the increase in the value of the air amount information, and
wherein the controller is further configured to:
use, as a required throttle valve opening degree at acceleration, a maximum throttle valve opening degree at which the required throttle valve opening degree becomes maximum in the introduced region of EGR gas, when a required torque that is higher than a required torque at the maximum throttle valve opening degree is required at the acceleration.

4. The control apparatus for an internal combustion engine according to claim 3, further comprising:
an in-cylinder pressure sensor that detects an in-cylinder pressure of the internal combustion engine, and
wherein the controller is further configured to, when the maximum throttle valve opening degree is used as a required throttle valve opening degree at the acceleration, perform a feedback control of the EGR valve opening degree so that the actual torque of the internal combustion engine that is obtained using the in-cylinder pressure sensor becomes the required torque.

5. The control apparatus for an internal combustion engine according to claim 3,
wherein the internal combustion engine is mounted on a hybrid vehicle that includes a second power source in addition to the internal combustion engine.

6. A control apparatus for an internal combustion engine, comprising:
throttle valve control means for controlling, in accordance with a required throttle valve opening degree, a throttle valve opening degree of a throttle valve for adjusting an air amount that is taken into an internal combustion engine;
EGR valve control means for controlling, in accordance with a required EGR valve opening degree, an EGR valve opening degree of an EGR valve for opening and closing an EGR passage that makes an intake passage and an exhaust passage communicate with each other;
required torque obtaining means for obtaining a required torque that is required of the internal combustion engine;
air amount information obtaining means for obtaining an air amount information concerning the air amount;
required throttle valve opening degree setting means for setting the required throttle valve opening degree based on the required torque in accordance with a first relation information that defines a relation between the required torque and the required throttle valve opening degree; and
required EGR valve opening degree setting means for setting the required EGR valve opening degree based on the air amount information in accordance with a second relation information that defines a relation between the air amount information and the required EGR valve opening degree,
wherein the second relation information is set so that with respect to an increase in a value of the air amount information, the required EGR valve opening degree increases and then decreases,
wherein the first relation information has a setting region in which with respect to an increase in the required torque, the required throttle valve opening degree once decreases, in association with the required EGR valve opening degree being set in the second relation information so as to decrease with respect to the increase in the value of the air amount information, and
wherein the control apparatus for the internal combustion engine further comprises:
required EGR valve opening degree limiting means for, in a process in which an actual torque of the internal combustion engine transits toward a required torque in the setting region in a state in which an actual throttle valve opening degree has been controlled to a required throttle valve opening degree corresponding to the required torque in the setting region when the required torque in the setting region is required at acceleration, limiting the required EGR valve opening degree so that the required EGR valve opening degree obtained during the process of transition on a basis of the air amount information changing during the process of transition and the second relation information does not exceed a final required EGR valve opening degree at the acceleration obtained on a basis of the air amount information corresponding to the required torque in the setting region and the second relation information, with the final required EGR valve opening degree at the acceleration as an upper limit value.

7. A control apparatus for an internal combustion engine, comprising:

throttle valve control means for controlling, in accordance with a required throttle valve opening degree, a throttle valve opening degree of a throttle valve for adjusting an air amount that is taken into an internal combustion engine;

EGR valve control means for controlling, in accordance with a required EGR valve opening degree, an EGR valve opening degree of an EGR valve for opening and closing an EGR passage that makes an intake passage and an exhaust passage communicate with each other;

required torque obtaining means for obtaining a required torque that is required of the internal combustion engine;

air amount information obtaining means for obtaining an air amount information concerning the air amount;

required throttle valve opening degree setting means for setting the required throttle valve opening degree based on the required torque in accordance with a first relation information that defines a relation between the required torque and the required throttle valve opening degree; and required EGR valve opening degree setting means for setting the required EGR valve opening degree based on the air amount information in accordance with a second relation information that defines a relation between the air amount information and the required EGR valve opening degree, wherein the second relation information is set so that with respect to an increase in a value of the air amount information, the required EGR valve opening degree increases and then decreases, wherein the first relation information is set in an introduced region of EGR gas so that with respect to an increase in the required torque, the required throttle valve opening degree increases and then decreases, in association with the required EGR valve opening degree being set in the second relation information so as to increase and then decrease with respect to the increase in the value of the air amount information, and wherein the control apparatus for the internal combustion engine further comprises:

required throttle valve opening degree limiting means that uses, as a required throttle valve opening degree at acceleration, a maximum throttle valve opening degree at which the required throttle valve opening degree becomes maximum in the introduced region of EGR gas, when a required torque that is higher than a required torque at the maximum throttle valve opening degree is required at the acceleration.

* * * * *